Jan. 13, 1948. R. J. DOLUDE 2,434,488
ERECTING DEVICE FOR GYROSCOPES
Filed Jan. 8, 1945 2 Sheets-Sheet 1

INVENTOR.
ROMAN J. DOLUDE
BY

Jan. 13, 1948.   R. J. DOLUDE   2,434,488
ERECTING DEVICE FOR GYROSCOPES
Filed Jan. 8, 1945   2 Sheets-Sheet 2

INVENTOR.
ROMAN J. DOLUDE
BY

Patented Jan. 13, 1948

2,434,488

UNITED STATES PATENT OFFICE 2,434,488

ERECTING DEVICE FOR GYROSCOPES

Roman J. Dolude, Los Angeles, Calif., assignor to General Electric Company, a corporation of New York Application January 8, 1945, Serial No. 571,811

1 Claim. (Cl. 74—5)

My invention relates to an erecting device for gyroscopes and has particular reference to an electrically operated means for erecting gyroscopes when they are shifted off axis as the result of gimbal friction. The invention finds particular utility when employed as an improvement on gyroscopic aircraft instruments.

In many aircraft instruments, as in other applications, the inherent tendency of a gyroscope to maintain its axis of rotation fixed in space is used for indicating the altitude of an aeroplane or for providing a stable base upon which may be mounted guns, navigation instruments or bomb sights. It is well known that the gyroscope axis will remain fixed only so long as there is no force applied tending to rotate the axis. Such a force, if applied, results in the axis shifting at right angles to the direction of the applied force. Such a shift results when the structure upon which the gyroscope is mounted is itself rotated as, for example, when an aeroplane turns or dives. This is because the trunnions employed in the gimbal mounting of the gyroscope are not purely frictionless and a small force is transmitted through the gimbal to the gyroscope. It therefore becomes necessary to provide some mechanism for restoring the gyroscope axis to its original position in order to avoid an erroneous indication.

Prior to my invention devices have been provided for erecting gyroscopes. One prior device which uses compressed air as the motive power for rotating the gyroscope mass includes vanes which come into line with an air blast upon a shift of the axis, and the resulting force on the vanes serves to shift the axis back to its normal position. The prior devices have the disadvantage of being complicated and expensive to manufacture, they are slow in response and inaccurate in operation.

It is, therefore, an object of the present invention to provide an erecting device for gyroscopes which overcomes the above noted disadvantages by operating quickly and requiring a minimum of mechanism for effecting the desired control.

It is a still further object of my invention to provide a device of the character set forth in the preceding paragraph which includes a set of movable weights, together with a means for moving the appropriate weights in response to a shift of the gyroscope axis to thereby unbalance the gyroscope in such direction as to restore the axis to its normal position.

It is additionally an object of my invention to provide a device of the character set forth in the preceding paragraphs in which the weights are shifted by electrical means actuated by means of switches which are closed in response to a shift of the gyroscope axis.

It is also an object of my invention to provide a device of the character set forth in the preceding paragraph in which the electromagnets or solenoids are used to shift the weights.

Other objects and advantages of my invention will become apparent from a study of the following specification, read in connection with the accompanying drawings, wherein.

Figure 1:
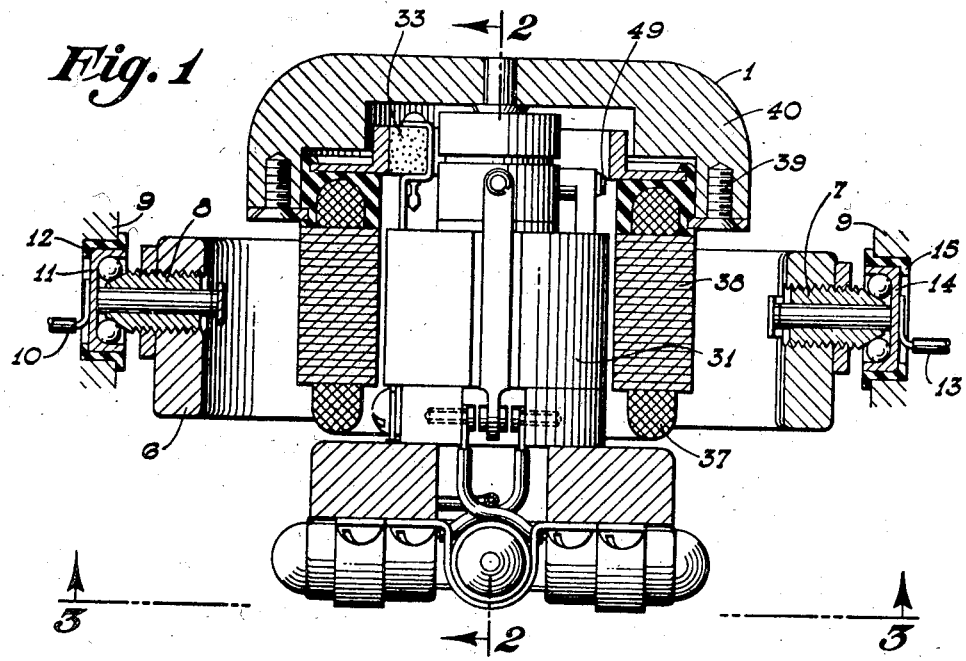
Fig. 1 is a longitudinal sectional view of an electrically driven gyroscope illustrating the preferred form of erecting device of my invention.

Referring to the drawings, I have illustrated in Figs. 1, 2 and 3 a gyroscope of the electrically operated type which, except as will be hereinafter pointed out, is more or less conventional in construction. The device includes a rotating mass 1 which is mounted upon a shaft 2, the shaft 2 defining the axis of rotation of the gyroscope and coinciding with what is termed the gyroscope axis. The shaft 2 is mounted for rotation upon a frame 3 which is journaled as by trunnions 4 and 5 within a gimbal ring 6. The ring 6 is similarly pivotally secured as by means of trunnions 7 and 8 to the framework of the aircraft or other supporting structure indicated generally by the reference character 9.

The trunnions 7 and 8 are axially aligned and are positioned at right angles to the axial trunnions 4 and 5. This provides a universal mounting for the supporting frame 3, permitting universal rotation of the supporting structure 9 about the frame 3.

Power for operating the electric gyroscope drive is carried through the trunnions 7, 8, the ring 6 and the trunnions 4, 5 to the frame 3. One supply line represented by the wire 10 may be connected to a stationary bearing member 11 forming a part of the trunnion 8 and electrically insulated from the frame 9 as by means of insulation material 12. The other lead, represented by a wire 13, may be similarly connected to a stationary member 14 forming a part of the trunnion 7 and which is in turn electrically insulated as by means of insulation material 15 from the frame 9.

The ring 6 is preferably formed in halves comprising a left-hand portion 6a (Fig. 3) and a right-hand portion 6b. These portions are electrically insulated from each other as by means of insulating spacers 16 and 17, the halves being joined to each other as by means of screws or bolts 18 and 19 which are in turn insulated from one of the ring portions by means of insulating sleeves 20 and 21.

Figure 3:
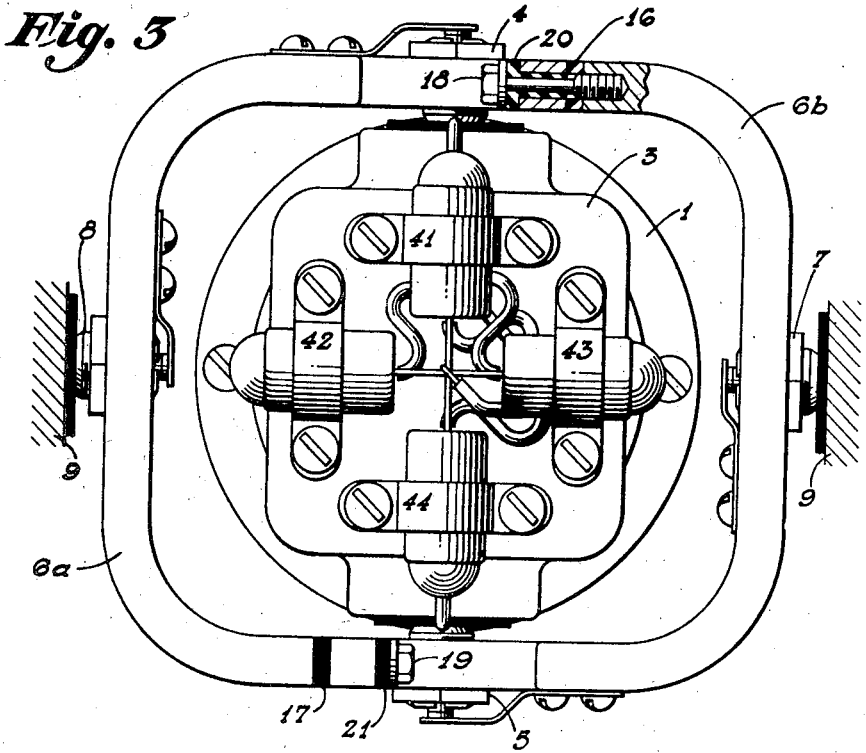
Fig. 3 is an end elevational view of the device shown in Fig. 1, Fig. 3 being taken substantially along the line III—III of Fig. 1.

As is shown in Fig. 3, the insulator 16 is placed to the right of trunnion 4 and the insulator 17 is placed to the left of trunnion 5 so that the ring portion 6a and the trunnion 4 forms a continuation of the electrical conductor 10 while the ring porion 6b and the trunnion 5 forms a continuation of the electrical conductor 13. The trunnions 4 and 5 each engage bearing portions 22 and 23 which are fixed relative to the frame 3 and insulated therefrom as by means of insulating cups 24 and 25. Electrical conductors 26 and 27 suitably attached, as by means of soldering or brazing to the bearing portions 22 and 23, serve as extensions of the conductors 10 and 13, respectively.

The frame 3 includes an upstanding sleeve portion 28 which is bored to receive the shaft 2 and which carries suitable anti-friction bearings 29 and 30 journaling the shaft 2 for rotation. Upon the upstanding sleeve portion 28 there is mounted a permanent magnet structure or motor field 31. Upon this stationary structure is mounted a pair of brushes 32 and 33, the same comprising, by preference, blocks of carbon carried upon vertically disposed spring members 34 received within the slots 35 formed in the magnet 31. The springs 34 serve as electrical conductors and as means for resiliently holding the brushes 32 and 33 into engagement with the inner surface of a circular cylindrical commutator 36. The commutator 36 may be formed of a plurality of segments as is conventional with commutators for direct current or universal motors.

These commutator segments are connected in the usual manner to an armature winding 37 which is mounted upon the rotating armature 38. The armature 38, armature winding 37 and commutator 36 are secured as by means of screws 39 to a mass 40 of inverted cup form which is in turn suitably affixed to the upstanding end of the shaft 2. This mass, together with the armature 38 and associated parts, forms the rotating mass of the gyroscope. The conductors 26 and 27 are connected, respectively, to the brushes 32 and 33 so that the circuit between conductors 10 and 13 is completed through the armature winding 38.

The motor just described uses a permanent magnet stationary field positioned within a rotating electromagnetic armature. Proper positioning of the brushes 32 and 33 and proper connections of the armature winding 37 with the commutator 36 in the conventional manner provides an electric motor with the armature on the outside rotating as the rotating mass of the gyroscope.

The construction thus far defined is more or less conventional. The improvement to which this application is directed is in the provision of an erecting device which is particularly adapted for use with a gyroscope of the character above described.

Figure 2:
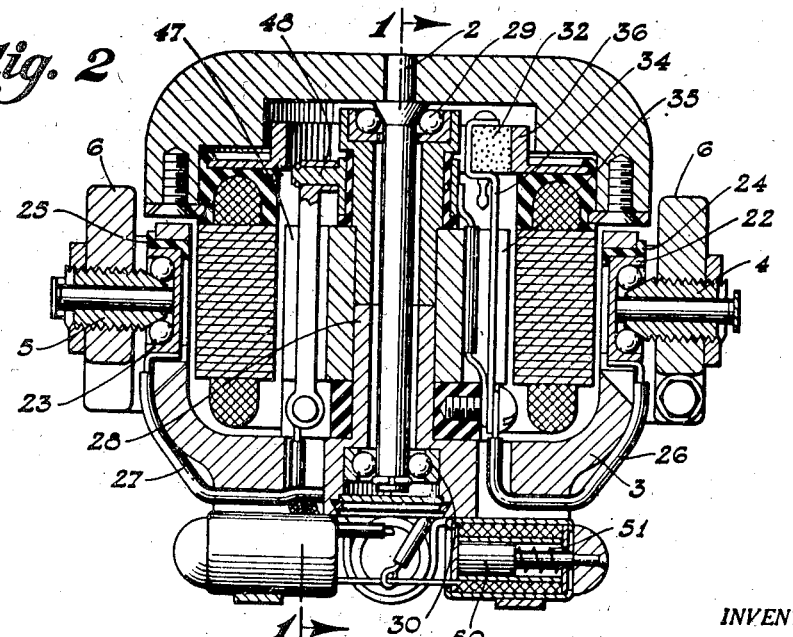
Fig. 2 is a longitudinal sectional view taken at right angles to Fig. 1 and substantially along the line II—II of Fig. 1.

As is best shown in Figs. 2 and 3, the frame 3 is provided with a plane under surface upon which is mounted four small solenoids 41, 42, 43 and 44, the solenoids 41 and 44 being oppositely disposed and at right angles to oppositely positioned solenoids 42 and 43. These solenoids are actuated by a pair of double-throw switches 45 and 46 comprising movable contact members 45a and 46a positioned between stationary contact members 45b, 45c and 46b, 46c. The stationary contact members 45b, 45c, 46b and 46c are mounted upon the frame 3 and insulated therefrom in the manner shown in Figs. 1 and 2. The movable contact members 45a and 46a comprise pendulums which are received within suitable slots 47 formed in the field magnet 31 and pivoted at their upper ends upon pivot supports 48 and 49 for rotation about axes at right angles to each other and at right angles to the axis of the shaft 2.

It will be seen that if the gyroscope axis is shifted from the vertical, the movable switch members 45a and 46a will move with respect to their associated stationary contact members and so complete an electric circuit to these members. This circuit is extended through the solenoids 41, 42, 43 and 44 so that energization of the associated solenoids will shift a core or plunger 50 outwardly away from the gyroscope axis against the restoring force of a small compression spring 51. The shift of the weights 50 will unbalance the gyroscope and so apply a force to the gyroscope in such direction as to cause its axis to return to the vertical. When verticality is again achieved, the contacts energizing the solenoids will be opened and the weights 50 will return to their inner positions.

Figure 4:
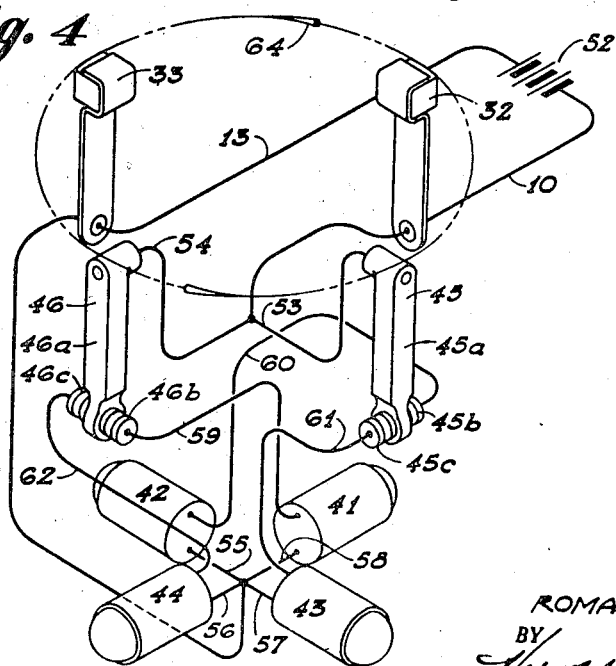
Fig. 4 is a schematic diagram illustrating the electrical connections employed in the device of my invention.

I have shown in Fig. 4 the electrical connections employed. The source of power for operating the gyroscope is represented as comprising a battery 52, although any suitable source of power may be used. The battery 52 is connected by means of conductors 10 and 13 which are extended through the gimbal mounting in the manner above described to the brushes 32 and 33, respectively, thus supplying power for rotating the armature and rotating mass 1. One conductor as, for example, the conductor 10 is continued as by means of conductors 53 and 54 to the movable switch arms 45a and 46a, respectively. The other conductor, as for example, conductor 13 is extended as by means of conductors 55, 56, 57 and 58 to one terminal, respectively, of the solenoids 41, 42, 43 and 44. The other terminal of the solenoid 41 is connected by a conductor 59 to the stationary contact 46b, the other terminal of the solenoid 42 is connected by means of a conductor 60 to the stationary contact 45b, the other terminal of the solenoid 43 is connected by a conductor 61 to the stationary contact 45c and the other terminal of the solenoid 44 is connected by means of a conductor 62 to the stationary contact 46c.

It will be seen that this early movement of the movable switch arms 45a or 46a into electrical connection with any one of the four stationary contact elements will result in the energization of the corresponding solenoid.

In order for the resulting shifting of the weights to effect the desired correction, it is necessary that the wiring be so arranged that a shift of the gyroscope in one direction will energize a solenoid located at right angles to the shift and in the direction of gyroscope rotation from the shift. This will apply a counter-force in such direction as to shift the gyroscope axis back to normal. For example, assume that the direction of rotation of the gyroscope is from the brush 32 toward the brush 33 as is indicated by the circular arrow 64 in Fig. 4. Assume also that the supporting structure 9 is rotated with respect to the gimbal ring 6 about the axis of the trunnions 7 and 8 in such direction as to move the trunnion 4 upwardly and the trunnion 5 downwardly as viewed in Fig. 2. This force which is transmitted to the frame 3 through the trunnions 4 and 5 results in the rotation of the gyroscope about the trunnions 4 and 5 in such direction as to incline the upper end of the shaft 2 toward the trunnion 7. This inclination will result in the movement of the pendulum 46a to the right, as viewed in Fig. 4, to complete the circuit to the solenoid 41, thereby shifting the weight 50 outwardly and applying to the frame 3 a gravitational force tending to rotate the gimbal ring 6 about the trunnions 8 and 9. This force applied to the gyroscope will result in a pivotal rotation of the frame 3 about the trunnions 4 and 5 in a direction exactly opposite to that which produced the original actuation of the solenoid 41.

As soon as the resulting motion proceeds sufficiently to restore the axis to its normal position, the pendulum 46a will return to its neutral position and de-energize the solenoid 41 so that the weight 50 may return to its innermost position and restore the balance of the system.

As an alternative arrangement two of the solenoids, as for example the solenoids 41 and 42, may be omitted and fixed weights substituted. The substituted weights should be sufficient to overbalance the gyroscope in the two respective directions so that alternate energization and de-energization of the remaining solenoids 43 and 44 may provide an average restoring force sufficient to maintain the gyroscope erect. If the solenoids 41 and 42 are omitted, the pendulums 45 and 46 may be replaced by a single universally mounted pendulum having a pair of contacts, one for each of the two remaining solenoids 43 and 44.

From the foregoing, it will be observed that I have provided an electromagnetic means for applying a counter-force to a gyroscope in such a manner as to erect the gyroscope if the axis thereof is shifted off vertical as a result of force applied through the friction in the gimbal mounting. The device disclosed is relatively instantaneous in operation and is simple in construction, permitting it to be added to existing gyroscopes. It is particularly adapted for use with electrically driven gyroscopes but may be used with equally advantageous results with gyroscopes driven by other sources of motive power, it being only necessary to employ an insulated trunnion and gimbal construction of the type illustrated in order to permit the required electrical energy to be conveyed to the solenoids.

It will be noted that the solenoids and the switches for actuating the solenoids are small and simple in construction, permitting them to be manufactured and installed at low cost and in a short time.

While I have shown and described the preferred embodiment of my invention, I do not desire to be limited to any of the details of construction shown or described herein, except as defined in the appended claim.

I claim:

A gyroscope comprising a rotor bearing frame supporting a rotor for rotation about an axis which is normally approximately vertical, gimbal means for supporting said frame to permit rotation thereof about horizontal gimbal axes, two pairs of coaxial solenoids mounted on said frame in substantially a horizontal plane with the axis of one pair at right angles to the axis of the other, each solenoid having a plunger movable toward and away from the gyroscope spin axis, a pair of pendulums pivotally mounted on said frame for rotation about axes parallel to the axes of said two pairs of solenoids, circuit means for supplying electrical power to said solenoids including switching means actuated by said pendulums for individually controlling the power supplied to each of said solenoids, the connections being such that each pendulum selectively controls each one of the pair of solenoids the axis of which is parallel to the rotation axis of the pendulum to provide gravity-responsive control of gyroscope balance in each of four horizontal directions, and spring means associated with the solenoids to bias the solenoid plungers to a position of gyroscope balance in the event of failure of the electrical power supply.

ROMAN J. DOLUDE.

REFERENCES CITED

The following references are of record in the file of this patent:

UNITED STATES PATENTS

| Number | Name | Date |
|---|---|---|
| 875,036 | Ash | Dec. 31, 1907 |
| 1,007,998 | Whalton | Nov. 7, 1911 |
| 1,405,807 | Tanner | Feb. 7, 1922 |
| 1,763,806 | Methvin | June 17, 1930 |
| 2,188,606 | Koster | Jan. 30, 1940 |
| 2,392,370 | Esval et al. | Jan. 8, 1946 |

FOREIGN PATENTS

| Number | Country | Date |
|---|---|---|
| 547,208 | Great Britain | Aug. 18, 1942 |